(No Model.)
G. E. ANDERSON.
CLUTCH.
No. 512,932.　　　　　　　　Patented Jan. 16, 1894.
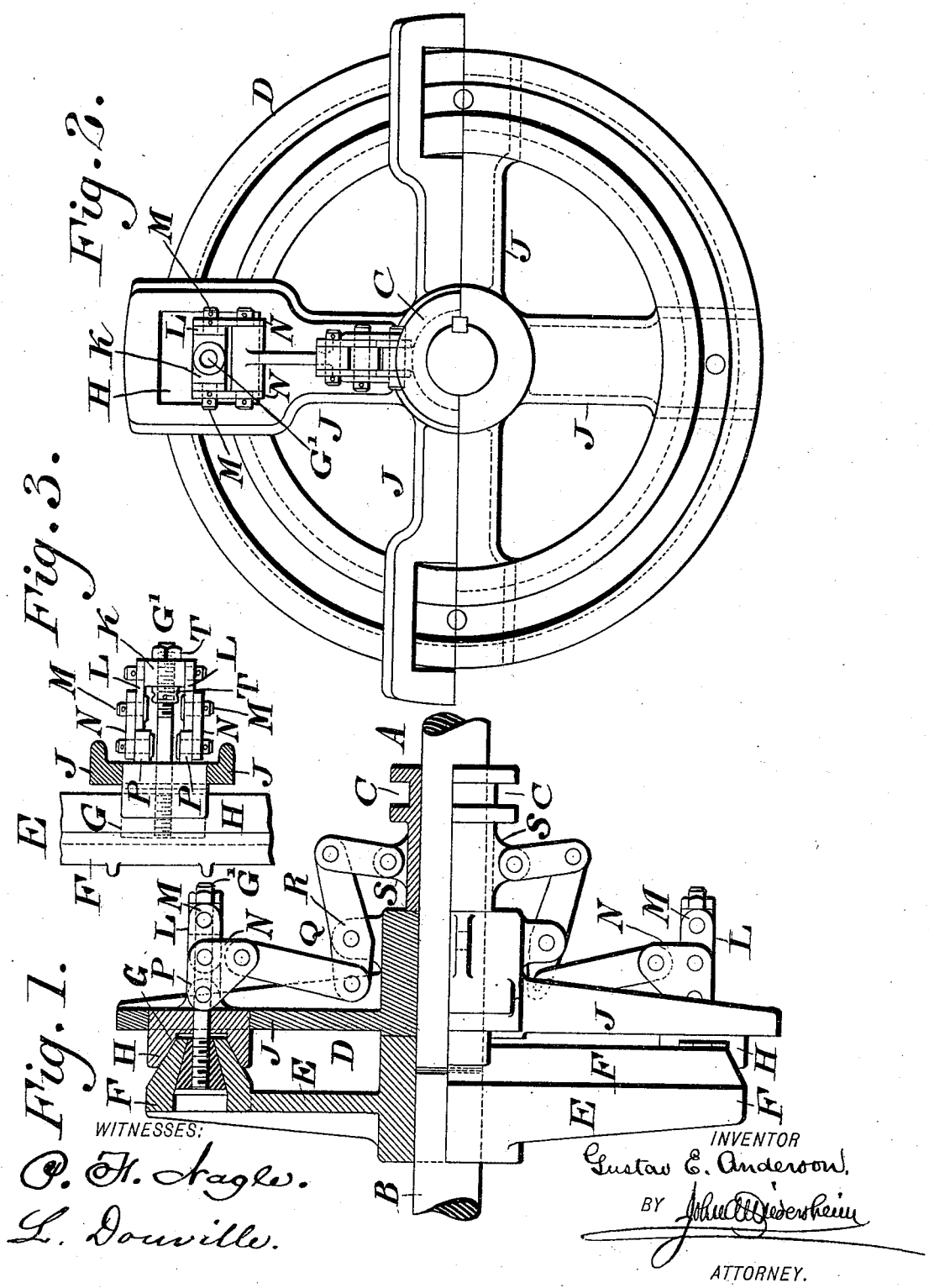
WITNESSES:
O. H. Nagle.
L. Douville.
INVENTOR
Gustav E. Anderson,
BY John A. Wiedersheim
ATTORNEY.
THE NATIONAL LITHOGRAPHING COMPANY,
WASHINGTON, D. C.

UNITED STATES PATENT OFFICE.

GUSTAV E. ANDERSON, OF PHILADELPHIA, PENNSYLVANIA, ASSIGNOR TO THE FAIRMOUNT MACHINE COMPANY, OF PENNSYLVANIA.

CLUTCH.

SPECIFICATION forming part of Letters Patent No. 512,932, dated January 16, 1894.

Application filed May 31, 1893. Serial No. 476,086. (No model.)

*To all whom it may concern:*

Be it known that I, GUSTAV E. ANDERSON, a citizen of the United States, residing in the city and county of Philadelphia, State of Pennsylvania, have invented a new and useful Improvement in Clutches, which improvement is fully set forth in the following specification and accompanying drawings.

My invention consists of a clutch formed of parts which are effective in operation, the construction being hereinafter set forth and pointed out in the claims.

Figure 1 represents a partial diametrical section and partial side elevation of a clutch embodying my invention. Fig. 2 represents a side elevation at a right angle to Fig. 1, certain parts having been removed. Fig. 3 represents a partial side and partial sectional view of a portion of the invention.

Similar letters of reference indicate corresponding parts in all the figures.

Referring to the drawings: A and B designate two adjacent shafts. On the shaft A is the sleeve C, which is rotatingly connected therewith by a feather, so as to slide thereon, said shaft A having also connected with it the fixed clutch member D. On the shaft B is the loose clutch member E, near whose periphery is the raised or projecting rim F, having a circular recess therein within which recess, at intervals, are the blocks G, the faces of said recess and blocks being tapering or conical in cross section. Connected with the blocks are bolts G', which pass freely through openings in the bases of recessed plates H, in the arms J, which radiate from the hub of the member D. The outer ends of said bolts G' are connected with heads K, on projecting studs of which are mounted one end of each of the levers L whose forward ends are connected by pivots M, with radial plates N, forming toggle levers whose inner ends are mounted on ears P, projecting from the plates H.

In the inner end of each of the plates N is pivoted a system of toggle levers Q, the middle lever of which is mounted on ears R on the hub of the member D, and the inner lever of which is mounted in ears S on the sleeve C.

The bolts G' are provided with nuts T, located on opposite sides of the heads K, for adjusting the blocks G', it being noticed that the blocks G are within the rim F, and the latter is within the recessed plates H, without primarily imparting motion to each other.

The operation is as follows: When the sleeve is shifted, say toward the right from that shown, the toggle levers Q are so operated that the upper lever thereof, turns the plates N in such direction that the bolts G' are moved toward the left, whereby the blocks G are released or freed from contact with the rim F, and the latter loosened from the plates H so that the two members D and E are unclutched. When the sleeve is now shifted to the left, the levers Q move the plates N so that the bolts G' are moved to the right, thereby the blocks G are forced into and wedged against the rim F and the latter into and against the plates H, and thus the two members D and E are connected or clutched, and the motion of the member D communicated to the member E.

Having thus described my invention, what I claim as new, and desire to secure by Letters Patent, is—

1. A clutch member with a recessed rim, and a clutch member with a recessed plate which receives said rim, a wedging block in said rim, a bolt connected with said block, and passing freely through said plate, and means for operating said bolt in opposite directions, said parts being combined substantially as described.

2. A clutch member having a rim with a circular recess therein, and a clutch member with a recessed plate adapted to receive said rim, a bolt with a tapering block in said recess, a sleeve, and levers connected to said sleeve, plate, and bolt for operating the said block, said parts being combined substantially as described.

3. A clutch member having a circular recess in its raised rim, a clutch member having a recessed plate adapted to receive said rim, a bolt with a tapering block in said recess in the rim, a movable sleeve, a head on said bolt, a toggle lever pivoted to said head and to ears on said plate, and a series of levers pivoted to said sleeve and to said toggle lever, said parts being combined substantially as described.

GUSTAV E. ANDERSON.

Witnesses:
JOHN A. WIEDERSHEIM,
WM. C. WIEDERSHEIM.